(12) United States Patent
Zhang et al.

(10) Patent No.: US 11,536,560 B2
(45) Date of Patent: Dec. 27, 2022

(54) OPTICAL APPARATUS, OPTICAL SYSTEM, AND METHOD FOR MEASURING AN AMOUNT OF STRAIN OF AN OBJECT

(71) Applicants: HEFEI BOE DISPLAY TECHNOLOGY CO., LTD., Anhui (CN); BOE TECHNOLOGY GROUP CO., LTD., Beijing (CN)

(72) Inventors: Yuntian Zhang, Beijing (CN); Chunxu Zhang, Beijing (CN); Zhonghou Wu, Beijing (CN); Qiong Zhang, Beijing (CN); Ke Dai, Beijing (CN); Haipeng Yang, Beijing (CN); Peng Jiang, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 348 days.

(21) Appl. No.: 16/651,973

(22) PCT Filed: Aug. 22, 2019

(86) PCT No.: PCT/CN2019/101968
§ 371 (c)(1),
(2) Date: Mar. 27, 2020

(87) PCT Pub. No.: WO2020/042999
PCT Pub. Date: Mar. 5, 2020

(65) Prior Publication Data
US 2020/0256667 A1 Aug. 13, 2020

(30) Foreign Application Priority Data
Aug. 28, 2018 (CN) .......................... 201810990791.5

(51) Int. Cl.
*G01B 11/16* (2006.01)

(52) U.S. Cl.
CPC .......... *G01B 11/161* (2013.01); *G01B 11/168* (2013.01)

(58) Field of Classification Search
CPC ........................... G01B 11/161; G01B 11/168
See application file for complete search history.

(56) References Cited

U.S. PATENT DOCUMENTS

| 2011/0237999 | A1* | 9/2011 | Muller | ................. A61N 5/0625 351/215 |
| 2016/0258743 | A1* | 9/2016 | Yao | ...................... G01B 11/168 |

(Continued)

FOREIGN PATENT DOCUMENTS

| CN | 101769722 A | 7/2010 |
| CN | 102914256 A | 2/2013 |

(Continued)

OTHER PUBLICATIONS

English translation of CN 105675150. Acquired from the USPTO's FIT database on May 4, 2022. (Year: 2022).*

(Continued)

*Primary Examiner* — Michael A Lyons
(74) *Attorney, Agent, or Firm* — Procopio, Cory, Hargreaves & Savitch LLP

(57) ABSTRACT

An optical apparatus includes a coherent light source; a transmission assembly configured to receive light emitted by the coherent light source, split the light into object light and reference light so that the object light and the reference light travel along different paths receive object light reflected by an object to be measured, and combine the object light reflected by the object to be measured and the reference light; and a photosensitive camera disposed at an output of the transmission assembly, and configured to receive combined light and process the combined light to record light intensity information capable of characterizing a spatial position of a surface of the object to be measured.

14 Claims, 4 Drawing Sheets

(56) References Cited

U.S. PATENT DOCUMENTS

2019/0072417 A1    3/2019  Khadour et al.
2020/0077897 A1*   3/2020  Saeki ................. G01N 29/0672

FOREIGN PATENT DOCUMENTS

| | | |
|---|---|---|
| CN | 103528524 A | 1/2014 |
| CN | 103776814 A | 5/2014 |
| CN | 105675150 A | 6/2016 |
| CN | 105716536 A | 6/2016 |
| CN | 105866873 A | 8/2016 |
| CN | 106568392 A | 4/2017 |
| CN | 107167087 A | 9/2017 |
| CN | 107228632 A | 10/2017 |
| KR | 20180039201 A | 4/2018 |
| WO | 2017051119 | 3/2017 |
| WO | 2019238505 A1 | 12/2019 |

OTHER PUBLICATIONS

English translation of CN 107228632. Acquired from the USPTO's FIT database on May 5, 2022. (Year: 2022).*
Office Action for related CN App. No. 201810990791.5 dated Jun. 30, 2020. English translation provided; 33 pages.

* cited by examiner

OPTICAL APPARATUS, OPTICAL SYSTEM, AND METHOD FOR MEASURING AN AMOUNT OF STRAIN OF AN OBJECT

CROSS-REFERENCE TO RELATED APPLICATIONS

This application is a national phase entry under 35 USC 371 of International Patent Application No. PCT/CN2019/101968 filed on Aug. 22, 2019, which claims priority to Chinese Patent Application No. 201810990791.5, filed with the Chinese Patent Office on Aug. 28, 2018, which are incorporated herein by reference in their entirety.

TECHNICAL FIELD

The present disclosure relates to the technical field of strain measurement of an object, and in particular, to an optical apparatus, an optical system, and a method for measuring an amount of strain of an object.

BACKGROUND

A strain reflects deformation condition of a structure after the structure is subjected to stress. An application of a strain measurement is important in a case where materials having various types of structures are in a complex working environment such as a high-temperature working environment, a high-pressure working environment or a high-speed working environment. Results of the strain measurement may reflect mechanical condition of a structural component that results from structural characteristics, dynamic loads and environmental loads in a working process. Therefore, failures of materials of some parts where the stress is concentrated (such as a main wing of a jet airplane and a propeller of a turboprop aircraft) due to long time cycle loads may be prevented, and an overall devastating damage to the system may be further prevented.

SUMMARY

In one aspect, an optical apparatus is provided. The optical apparatus includes: a coherent light source; a transmission assembly configured to receive light emitted by the coherent light source, split the light into object light and reference light so that the object light and the reference light travel along different paths, receive object light reflected by an object to be measured, and combine the object light reflected by the object to be measured and the reference light; and a photosensitive camera disposed at an output of the transmission assembly and configured to receive combined light and process the combined light to record light intensity information capable of characterizing a spatial position of a surface of the object to be measured.

In some embodiments, the photosensitive camera includes: a micro-polarizer array configured to cause interference between the object light reflected by the object to be measured and the reference light in the combined light to generate interference fringes; and an image sensor configured to record light intensity information of the interference fringes.

In some embodiments, the micro-polarizer array includes a plurality of micro-polarizers arranged in an array. The plurality of micro-polarizers are divided into a plurality of repeating units. Each of the plurality of repeating units includes at least four adjacent micro-polarizers. All micro-polarizers included in each repeating unit are arranged in N rows and M columns, and polarization directions of the micro-polarizers in the repeating unit are different. N is greater than or equal to 2, and M is greater than or equal to 2. The image sensor includes a plurality of photosensitive elements disposed in one-to-one correspondence with the plurality of micro-polarizers.

In some embodiments, the repeating unit includes four micro-polarizers, and polarization directions of the four micro-polarizers are 0°, 45°, 90°, and 135°.

In some embodiments, the plurality of micro-polarizers in the micro-polarizer array are attached to the image sensor through a photosensitive adhesive. Or, the image sensor includes a wafer in which the plurality of photosensitive elements are disposed, and the micro-polarizer array is formed on the wafer.

In some embodiments, the transmission assembly includes: a light-splitting component configured to split the light emitted by the coherent light source into object light and reference light, polarization directions of which are perpendicular to each other; an object light transmission component configured to receive the object light, direct the object light toward the object to be measured, and reflect the object light reflected by the object to be measured; and a light-combining component configured to receive object light reflected by the object light transmission component and the reference light, and combine the object light reflected by the object light transmission component and the reference light.

In some embodiments, the transmission assembly further includes: a reflecting component configured to reflect the reference light output from the light-splitting component to the light-combining component; and a first light-modulating component disposed at an output of the light-combining component, and configured to convert light combined by the light-combining component from linearly polarized light to circularly polarized light.

In some embodiments, the light-splitting component includes a first polarization beam splitter prism. The light-combining component includes a second polarization beam splitter prism.

In some embodiments, the object light transmission component includes a transflective beam splitter prism.

In some embodiments, the reflective component includes a reflecting mirror. The first light-modulating component includes a quarter wave plate.

In some embodiments, the optical apparatus further includes: at least one collimated beam expander disposed between the coherent light source and the light-splitting component. Each collimated beam expander includes at least two lenses, and focal lengths of the at least two lenses are different.

In some embodiments, the optical apparatus further includes: a second light-modulating component disposed between the coherent light source and a collimated beam expander that is most proximate to the coherent light source in the at least one collimated beam expander. The second light-modulating component is configured to modulate a linear polarization angle of the light emitted by the coherent light source.

In some embodiments, the second light-modulating component includes a half wave plate.

In another aspect, an optical system is provided. The optical system includes: the optical apparatus according to any of the above embodiments; a processor configured to calculate phase information of the object light reflected by the object to be measured according to light intensity information recorded by the photosensitive camera in the optical apparatus, and calculate an amount of strain of the object to be measured according to a change between the phase information before the object to be measured is deformed and the phase information after the object to be measured is deformed.

In yet another aspect, a method for measuring an amount of strain of an object applied to the optical system in any of the above embodiments is provided. The method includes: calculating the phase information of the object light reflected by the object to be measured according to the light intensity information recorded by the optical apparatus in the optical system; and calculating the amount of strain of the object to be measured according to a change between the phase information before the object to be measured is deformed and the phase information after the object to be measured is deformed.

In some embodiments, the optical apparatus includes a photosensitive camera including a micro-polarizer array and an image sensor. The micro-polarizer array includes a plurality of micro-polarizers, each repeating unit includes at least four adjacent micro-polarizers. All micro-polarizers included in each repeating unit are arranged in N rows and M columns, and polarization directions of all the micro-polarizers included in the repeating unit are different. N is greater than or equal to 2, and M is greater than or equal to 2. The image sensor includes a plurality of photosensitive elements disposed in one-to-one correspondence with the plurality of micro-polarizers.

The step of calculating the phase information of the object light reflected by the object to be measured according to the light intensity information recorded by the optical apparatus in the optical system includes:

obtaining a relational expression between light intensity information I recorded by each photosensitive element and phase information ω of object light received by a corresponding repeating unit according to a following formula (1):

$$I = \frac{1}{2}\left[I_s + I_r + 2\sqrt{I_s I_r} \cos(\omega + 2\alpha)\right], \quad (1)$$

wherein α represents a polarization angle of a micro-polarizer corresponding to the photosensitive element, $I_s$ represents a light intensity of object light received by the photosensitive element, and $I_r$ represents a light intensity of reference light received by the photosensitive element; and calculating the phase information ω of the object light received by the corresponding repeating unit according to the relational expression between the light intensity information I recorded by the photosensitive element and the phase information ω of the object light received by the corresponding repeating unit, and the light intensity information I recorded by the photosensitive element. Phase information ω of object light received by all repeating units constitutes the phase information of the object light reflected by the object to be measured.

In some embodiments, in a case where each repeating unit includes four micro-polarizers, and polarization angles of the four micro-polarizers are respectively 0°, 45°, 90°, and 135°, relational expressions between light intensity information $I_1$, $I_2$, $I_3$, and $I_4$ recorded by respective photosensitive elements corresponding to respective micro-polarizers in the repeating unit and the phase information w of the object light received by the repeating unit are respectively:

$$I_1 = \frac{1}{2}\left[I_s + I_r + 2\sqrt{I_s I_r} \cos(\omega)\right]; \quad (2)$$

$$I_2 = \frac{1}{2}\left[I_s + I_r - 2\sqrt{I_s I_r} \sin(\omega)\right]; \quad (3)$$

$$I_3 = \frac{1}{2}\left[I_s + I_r - 2\sqrt{I_s I_r} \cos(\omega)\right]; \quad (4)$$

$$I_4 = \frac{1}{2}\left[I_s + I_r + 2\sqrt{I_s I_r} \sin(\omega)\right]; \quad (5)$$

and according to relational expressions (2) to (5), and the light intensity information $I_1$, $I_2$, $I_3$, and $I_4$ recorded by the respective photosensitive elements corresponding to the respective micro-polarizers in the repeating unit, the phase information of the object light received by the corresponding repeating unit is calculated to be:

$$\omega = \arctan\left(\frac{I_4 - I_2}{I_1 - I_3}\right). \quad (6)$$

In some embodiments, the step of calculating the amount of strain of the object to be measured according to a change between the phase information before the object to be measured is deformed and the phase information after the object to be measured is deformed, includes:

obtaining phase information $\omega_2(i,j)$ of object light received by respective photosensitive elements corresponding to respective micro-polarizers in a repeating unit that is in an i-th row and in a j-th column before the object to be measured is deformed, and phase information $\omega_1(i,j)$ of object light received by the respective photosensitive elements corresponding to the respective micro-polarizers in the repeating unit that is in the i-th row and in the j-th column after the object to be measured is deformed;

calculating an amount of strain in an x direction of the surface of the object to be measured that is photographed by the respective photosensitive elements corresponding to the respective micro-polarizers in the repeating unit that is in the i-th row and in the j-th column according to a following formula (7), $\omega_1(i,j)$ and $\omega_2(i,j)$:

$$\varepsilon_x = \frac{\omega_1(i,j) - \omega_2(i,j)}{\Delta x}; \quad (7)$$

and calculating an amount of strain in a y direction of the surface of the object to be measured that is photographed by the respective photosensitive elements corresponding to the respective micro-polarizers in the repeating unit that is in the i-th row and in the j-th column according to a following formula (8), $\omega_1(i,j)$ and $\omega_2(i,j)$:

$$\varepsilon_y = \frac{\omega_1(i,j) - \omega_2(i,j)}{\Delta y}, \quad (8)$$

wherein i and j are both positive integers, the x direction and the y direction are perpendicular to each other, and Δx and Δy are respectively actual sizes of a region of the object to be measured corresponding to the photosensitive elements in the x direction and in the y direction.

In yet another aspect, a non-transitory computer-readable storage medium is provided. The non-transitory computer-readable storage medium stores computer program instructions that, when run by a processor, cause the processor to perform one or more steps of the method for measuring the amount of strain of the object according to any of the above embodiments.

In yet another aspect, an electronic device is provided. The electronic device includes a processor and a memory. The memory stores computer program instructions suitable for being executed by the processor. When the computer program instructions are run by the processor, the processor performs one or more steps of the method for measuring the amount of strain of the object according to any of the above embodiments.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to these drawings.

DETAILED DESCRIPTION

Some embodiments of the present disclosure will be described below in combination with the accompanying drawings. Obviously, the described embodiments are merely some but not all of the embodiments of the present disclosure. All other embodiments made on the basis of the embodiments of the present disclosure by a person of ordinary skill in the art shall be included in the protection scope of the present disclosure.

Figure 1:
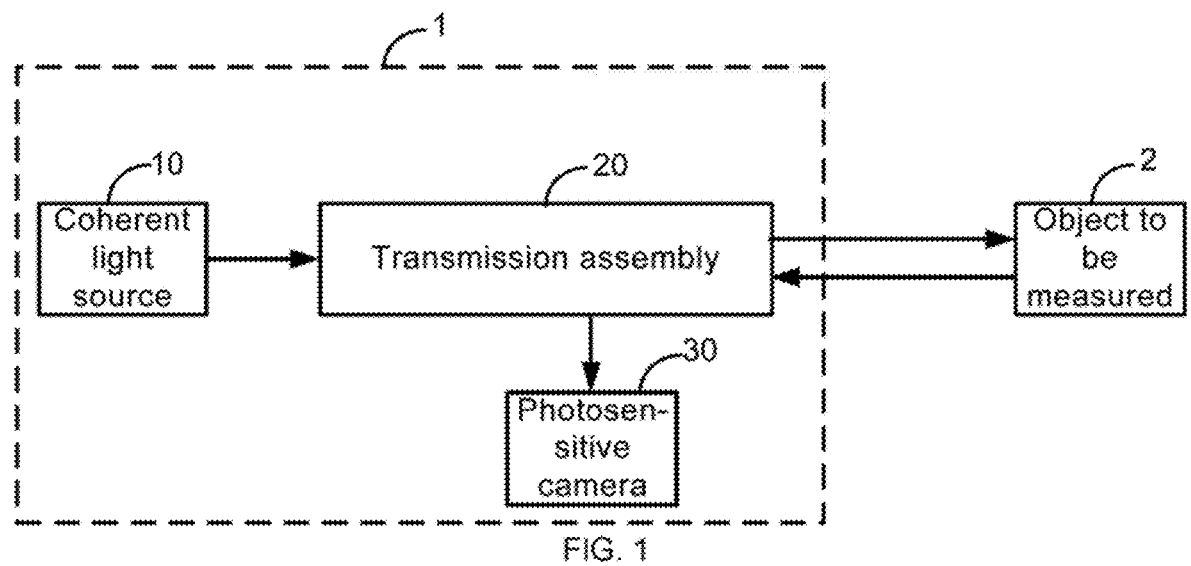
FIG. 1 is a schematic diagram showing a structure of an optical apparatus, according to some embodiments of the present disclosure.

Referring to FIG. 1, some embodiments of the present disclosure provide an optical apparatus 1. The optical apparatus 1 includes a coherent light source 10, a transmission assembly 20, and a photosensitive camera 30.

The coherent light source 10 is configured to emit light. The transmission assembly 20 is configured to receive the light emitted by the coherent light source, split the light into object light and reference light so that the object light and the reference light travel along different paths, receive object light reflected by an object to be measured 2, and combine the object light reflected by the object to be measured 2 and the reference light. With this design, the transmission assembly 20 may be used to cause the object light and the reference light in the light emitted by the coherent light source 10 to travel along different paths, and combine the reference light and the object light reflected by the object to be measured 2 before the reference light and the object light reflected by the object to be measured 2 reach the photosensitive camera 30.

It will be noted that, in the process of measuring an amount of strain of the object to be measured 2 by using the optical apparatus 1, the object light split by the transmission assembly 20 may be directed toward the object to be measured 2. In this way, the object light reflected by the object to be measured 2 that is received by the transmission assembly 20 may carry spatial position information of a surface of the object to be measured 2. The reference light split by the transmission assembly 20 is not directed toward the object to be measured 2. The reference light may be combined with the object light reflected by the object to be measured 2, so that the transmission assembly 20 may output the combined light, and the combined light carries the spatial position information of the surface of the object to be measured 2.

The photosensitive camera 30 is disposed at an output of the transmission assembly 20. The photosensitive camera 30 is configured to receive the combined light output by the transmission assembly 20 and process the combined light to record light intensity information capable of characterizing the spatial position of the surface of the object to be measured 2. With this design, the photosensitive camera 30 may record light intensity information characterizing a spatial position of the surface of the object to be measured 2 before the object to be measured 2 is deformed and light intensity information characterizing a spatial position of the surface of the object to be measured 2 after the object to be measured 2 is deformed, and thus the amount of strain of the object to be measured 2 may be obtained according to a change between the two pieces of light intensity information. Therefore, the optical apparatus 1 may detect a dynamic deformation of the object to be measured 2 in real time. In addition, the object to be measured 2 is only irradiated by the light and will not be damaged.

For example, the object to be measured 2 includes a civil bridge, an aircraft, a transportation vehicle, or the like. That is, the optical apparatus 1 may be applied to real-time strain detection and monitoring of the civil bridge, the aircraft, the transportation vehicle, or the like.

Figure 2:
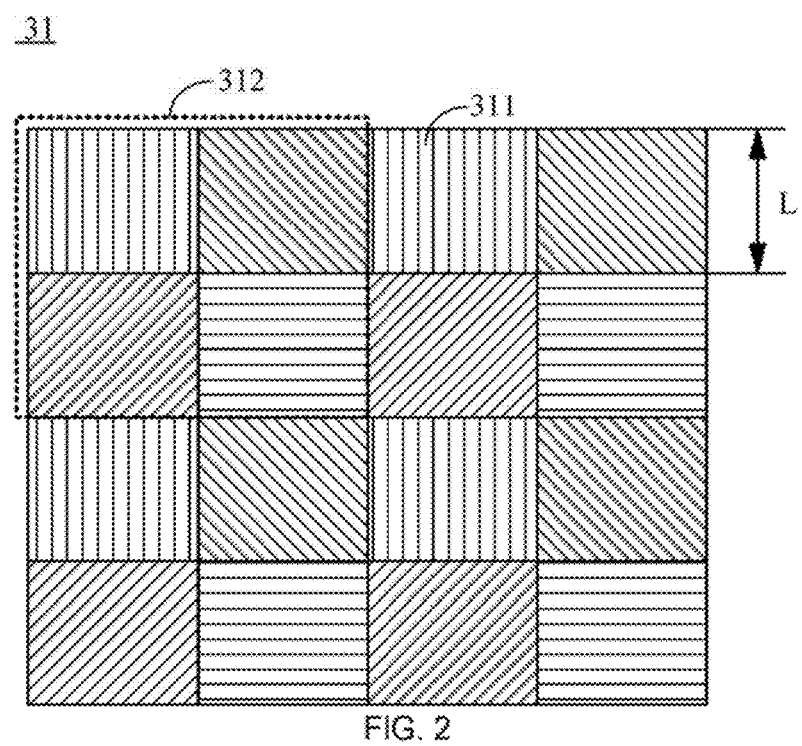
FIG. 2 is a schematic diagram of a micro-polarizer array, according to some embodiments of the present disclosure.
Figure 3:
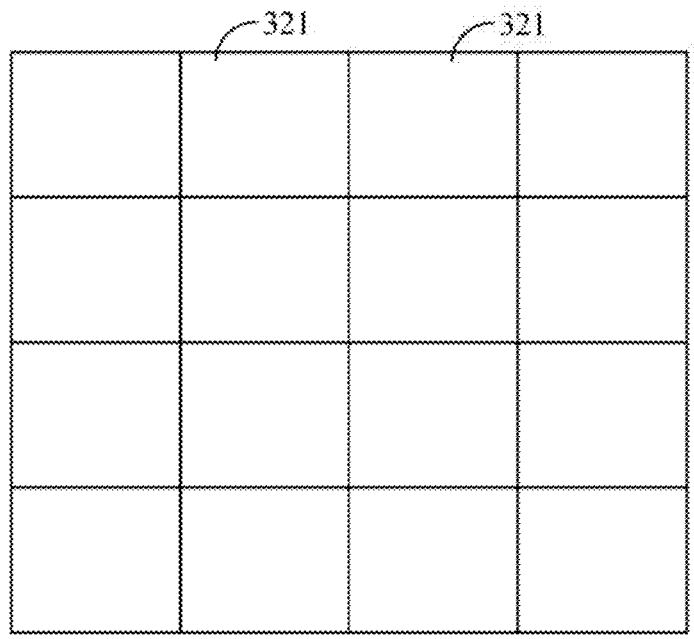
FIG. 3 is a schematic diagram of an image sensor, according to some embodiments of the present disclosure.

In some embodiments, as shown in FIGS. 2 and 3, the photosensitive camera 30 includes a micro-polarizer array 31 and an image sensor 32. The micro-polarizer array 31 is configured to cause interference between the object light and the reference light in the combined light to generate interference fringes. The image sensor 32 is configured to record light intensity information of the interference fringes.

Here, it will be noted that, the object light in the combined light is the object light reflected by the object to be measured 2. Therefore, after phase-shift interference occurs between the object light and the reference light in the combined light through the micro-polarizer array 31, the light intensity information of the generated interference fringes may characterize the spatial position of the surface reflecting the object light of the object to be measured 2. With this design, the photosensitive camera 30 may record light intensity information of interference fringes corresponding to the spatial position of the surface of the object to be measured 2 before the object to be measured 2 is deformed and light intensity information of interference fringes corresponding to the spatial position of the surface of the object to be measured 2 after the object to be measured 2 is deformed, and thus the amount of strain of the object to be measured 2 may be obtained according to the change between the two pieces of light intensity information.

It will be noted that, the light emitted by the coherent light source 10 is coherent light. Therefore, after the light emitted by the coherent light source 10 reaches the object to be measured 2 and the transmission assembly 20, the combined light output by the transmission assembly 20 may interfere to generate the interference fringes. In this way, by recording the light intensity information of the interference fringes by the image sensor 32, the spatial position information of the surface of the object to be measured 2 may be obtained.

For example, the coherent light source 10 is a laser. The laser may generate coherent light with a better coherence, which may improve an interference effect of the coherent light and make the light intensity information of the interference fringes recorded by the image sensor 32 more accurate. As a result, the amount of strain of the object to be measured 2 may be measured and analyzed, and a more accurate measurement result may be obtained.

In some embodiments, as shown in FIG. 2, the micro-polarizer array 31 includes a plurality of micro-polarizers 311 arranged in an array. For example, the micro-polarizer array 31 is a micro-polarizer array based on metal nano-gratings. For example, the micro-polarizer array 31 includes a base with a high light transmittance and metal nano-gratings arranged on the base. Directions in which the metal nano-gratings are arranged on the base are not exactly the same. A grating composed of adjacent metal nano-wires having a same arrangement direction is a micro-polarizer, and a plurality of micro-polarizers form the micro-polarizer array 31.

For example, as shown in FIG. 2, a length of each side of each micro-polarizer 311 is L, and L is greater than or equal to 1 μm, and is less than or equal to 15 μm. For example, L is between 1 μm and 5 μm, or L is between 6 μm and 10 μm, or L is between 11 μm and 15 μm. For another example, L is 1 μm, 5 μm, 6 μm, 7 μm, 10 μm, 11 μm or 15 μm.

The plurality of micro-polarizers 311 are divided into a plurality of repeating units 312. Each of the plurality of repeating units 312 includes at least four adjacent micro-polarizers 311. All the micro-polarizers 311 included in each repeating unit 312 are arranged in N rows and M columns, and polarization directions of all the micro-polarizers included in the repeating unit are different. N is greater than or equal to 2, and M is greater than or equal to 2. For example, N is equal to 2, and M is equal to 2. Or N is equal to 3, and M is equal to 4.

Here, it will be noted that, after the object light and the reference light in the combined light emitted from the transmission assembly 20 pass through each micro-polarizer 311, interference occurs and interference fringes are generated.

By setting the polarization directions of the micro-polarizers 311 in the micro-polarizer array 31, light intensity information of interference fringes in different polarization directions may be recorded by the image sensor. In this way, phase information of the object light reflected by the surface of the object to be measured 2 (the phase information of the object light reflected by the surface of the object to be measured 2 reflecting the spatial position information of the surface of the object to be measured 2) may be obtained through relevant calculation according to the light intensity information, thereby obtaining the amount of strain of the object to be measured 2 according to phase information of object light reflected by the surface of the object to be measured before the object to be measured 2 is deformed and phase information of object light reflected by the surface of the object to be measured after the object to be measured 2 is deformed.

For example, as shown in FIG. 2, each repeating unit 312 includes four micro-polarizers 311, and polarization directions of the four micro-polarizers 311 are 0°, 45°, 90°, and 135°. In this case, the four micro-polarizers 311 included in the repeating unit 312 are arranged in 2 rows and 2 columns. With this design, on one hand, an entire micro-polarizer array is easily manufactured. On the other hand, according to light intensity information of interference fringes generated by the four micro-polarizers 311 in each repeating unit 312, an amount of strain of a position corresponding to the repeating unit may be measured and analyzed. Further, the amounts of strain of positions corresponding to all the repeating units on the object to be detected 2, i.e., the amount of strain of the object to be measured 2, may be obtained.

On this basis, for example, as shown in FIG. 3, the image sensor 32 includes a plurality of photosensitive elements 321, and a region where each photosensitive element is located may also be referred to as a pixel.

The plurality of photosensitive elements 321 are disposed in one-to-one correspondence with the plurality of micro-polarizers 311. That is, each photosensitive element 321 of the plurality of photosensitive elements 321 is disposed at a light exit side of a micro-polarizer 311 corresponding to the photosensitive element 321. In this case, the plurality of photosensitive elements 321 are also arranged in an array, and all photosensitive elements 321 corresponding to each repeating unit 312 in the plurality of photosensitive elements 321 are also arranged in N rows and M columns. After the interference fringes generated after the combined light passes through each micro-polarizer 311 is recognized by a corresponding photosensitive element 321, the photosensitive element 321 may record light intensity information of the interference fringes generated by the corresponding micro-polarizer 311, thereby facilitating a measurement and an analysis of the amount of strain of the object to be measured 2.

For example, the image sensor includes a charge coupled device (CCD) image sensor, or a complementary metal-oxide semiconductor (CMOS) image sensor.

Figure 9:
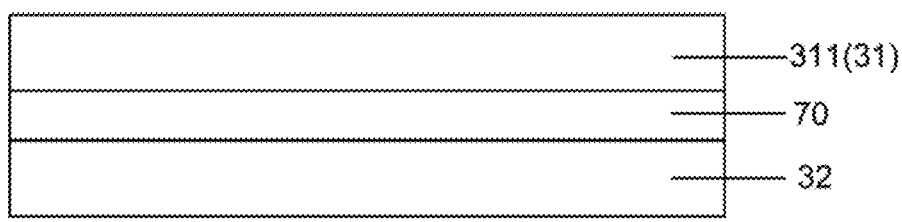
FIG. 9 is a schematic diagram of fixing the micro-polarizer array to the image sensor, according to some embodiments of the present disclosure.

There are a plurality of manners of fixing the micro-polarizer array 31 to the image sensor 32. In some examples, as shown in FIG. 9, the micro-polarizers 311 in the micro-polarizer array 31 are attached to the image sensor 32 through a photosensitive adhesive 70. In this way, the micro-polarizers in the micro-polarizer array may be easily assembled with the image sensor. That is, each micro-polarizer may be fixed on a corresponding photosensitive element in the image sensor through the photosensitive adhesive, which has advantages of reliable connection and high stability. Furthermore, the photosensitive adhesive does not easily affect a photosensitivity effect of the photosensitive elements, such that the photosensitive elements may still effectively record the light intensity information of the interference fringes generated by the micro-polarizer array.

In addition, a stable and reliable integration of the micro-polarizer array 31 and the image sensor 32 may also reduce a sensitivity of the photosensitive camera 30 to environmental changes. That is, the environmental changes do not easily affect the light intensity information of the interference fringes recorded by the image sensor. Therefore, the optical apparatus 1 may be applied to a complex measurement environment, a complex stress-strain condition, and a limited strain measurement range, and has a high robustness.

Figure 10:
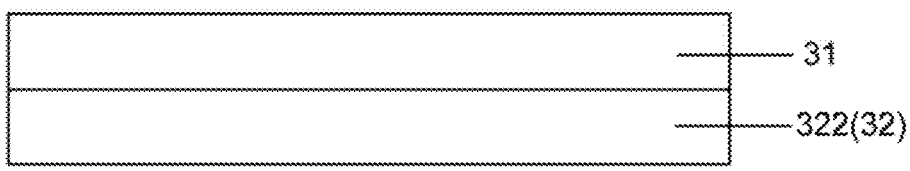
FIG. 10 is a schematic diagram showing another structure of fixing the micro-polarizer array to the image sensor, according to some embodiments of the present disclosure.

In some other examples, as shown in FIG. 10, the image sensor 32 includes a wafer 322, and the micro-polarizer array 31 is formed on the wafer 322. In this case, there are a plurality of photosensitive elements in the wafer, and the micro-polarizer array is directly manufactured on the wafer. In this way, each micro-polarizer may be fixed on a corresponding photosensitive element to form an integrated structure. For example, a thin film is formed on the wafer through an evaporation process, and then the thin film is etched through an etching process to obtain the plurality of micro-polarizers to form a micro-polarizer array.

In this way, the micro-polarizer array 31 and the image sensor 32 may be stably and reliably integrated, thereby reducing the sensitivity of the photosensitive camera 30 to the environmental changes. That is, the environmental changes do not easily affect the light intensity information of the interference fringes recorded by the image sensor. Therefore, the optical apparatus 1 may be applied to the complex measurement environment, the complex stress-strain condition, and the limited strain measurement range, and has a high robustness.

Figure 4:
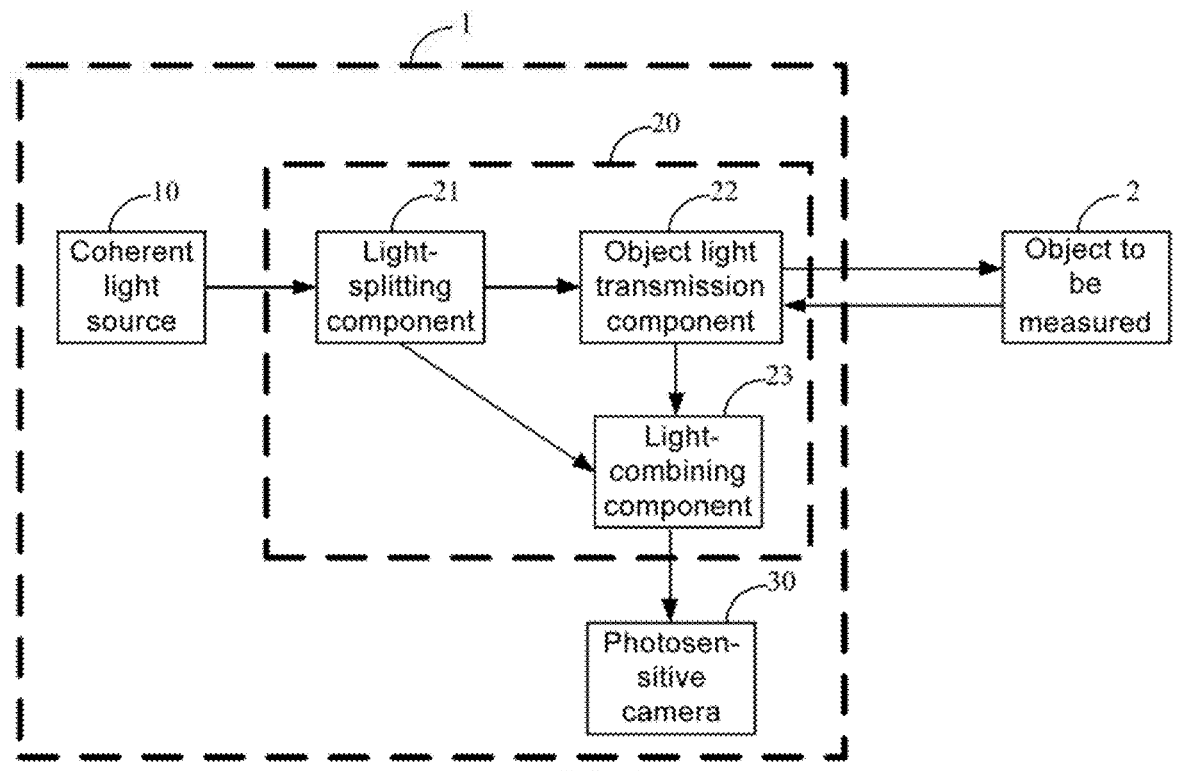
FIG. 4 is a schematic diagram showing a structure of another optical apparatus, according to some embodiments of the present disclosure.

In some embodiments, as shown in FIG. 4, the transmission assembly 20 includes a light-splitting component 21, an object light transmission component 22, and a light-combining component 23.

Figure 6:
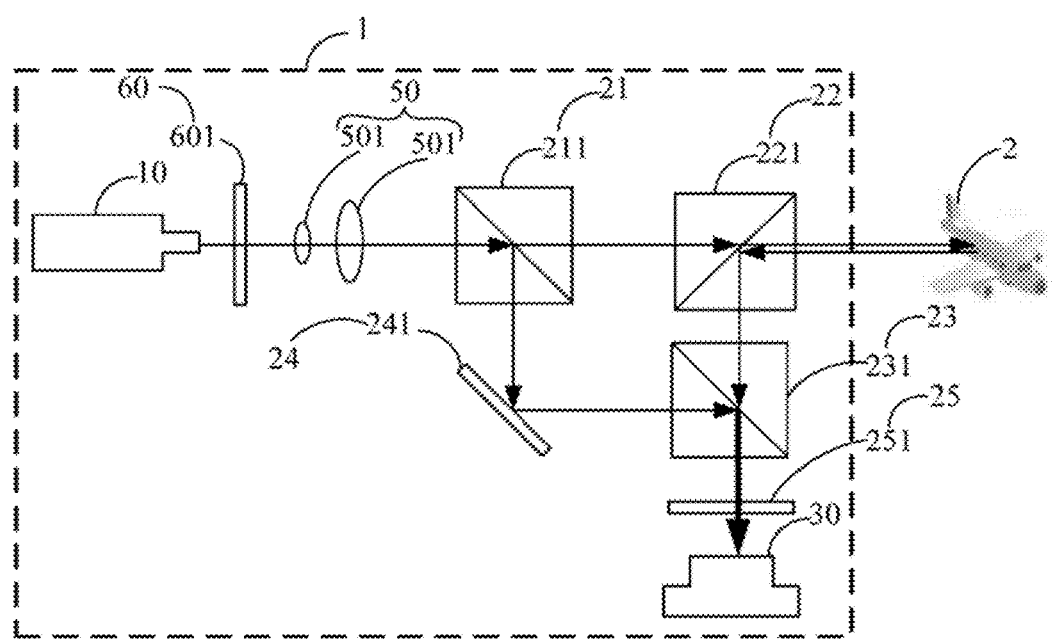
FIG. 6 is a schematic diagram showing a structure of yet another optical apparatus, according to some embodiments of the present disclosure.

The light-splitting component 21 is configured to split the light emitted by the coherent light source 10 into the reference light and the object light, polarization directions of which are perpendicular to each other. For example, as shown in FIG. 6, the light-splitting component 21 is a first polarization beam splitter prism 211. By using a property that a transmittance of P-polarized light is 1 and a transmittance of S-polarized light is less than 1 when the light is incident at a Brewster angle, the first polarization beam splitter prism 211 may make the P-polarized light totally transmitted and make the S-polarized light reflected. In this case, one of the P-polarized light and the S-polarized light may be used as the object light and the other as the reference light. For example, as shown in FIG. 6, the object light is the P-polarized light and may pass through the first polarization beam splitter prism 211. The reference light is the S-polarized light and may be reflected by the first polarization beam splitter prism 211. Moreover, the polarization directions of the object light and the reference light split by the first polarization beam splitter prism 211 are perpendicular to each other.

The object light transmission component 22 is configured to receive the object light output from the light-splitting component 21, direct the object light toward the object to be measured 2 and reflect the object light reflected by the object to be measured 2. For example, as shown in FIG. 6, the object light transmission component 22 is a transflective beam splitter prism 221. At least a part of object light incident on the transflective beam splitter prism 221 is transmitted to be directed toward the object to be measured 2. At least a part of object light reflected by the object to be measured 2 to the transflective beam splitter prism 221 is reflected to be directed toward the light-combining component 23. It will be seen that, object light reflected by the object light transmission component 22 to the light-combining component 23 actually carries the spatial position information of the surface of the object to be measured 2. Here, it will be noted that, the phase information of the object light reflected before the object to be measured 2 is deformed is different from the phase information of the object light reflected after the object to be measured 2 is deformed, which is caused by a deformation of the surface reflecting the object light of the object to be measured 2. Therefore, it will be considered that the object light reflected by the object to be measured 2 carries the spatial position information of the surface of the object to be measured 2. On this basis, the object light reflected by the object light transmission component 22 to the light-combining component 23 also actually carries the spatial position information of the surface of the object to be measured 2.

The light-combining component 23 is configured to receive the object light reflected by the object light transmission component 22 and the reference light output from the light-splitting component 21, and combine the object light reflected by the object light transmission component 22 and the reference light output from the light-splitting component 21. For example, as shown in FIG. 6, the light-combining component 23 is a second polarization beam splitter prism 231, and the second polarization beam splitter prism 231 is the same as the first polarization beam splitter prism 211. Therefore, it will be understood that, compared with the first polarization beam splitter prism 211, positions of an incident port and an exit port of the second polarization beam splitter prism 231 are exactly opposite. Therefore, the second polarization beam splitter prism 231 may receive the object light reflected by the object light transmission component 22 and the reference light output from the light-splitting component 21, combine the object light reflected by the object light transmission component 22 and the reference light output from the light-splitting component 21, and output the combined light.

Figure 5:
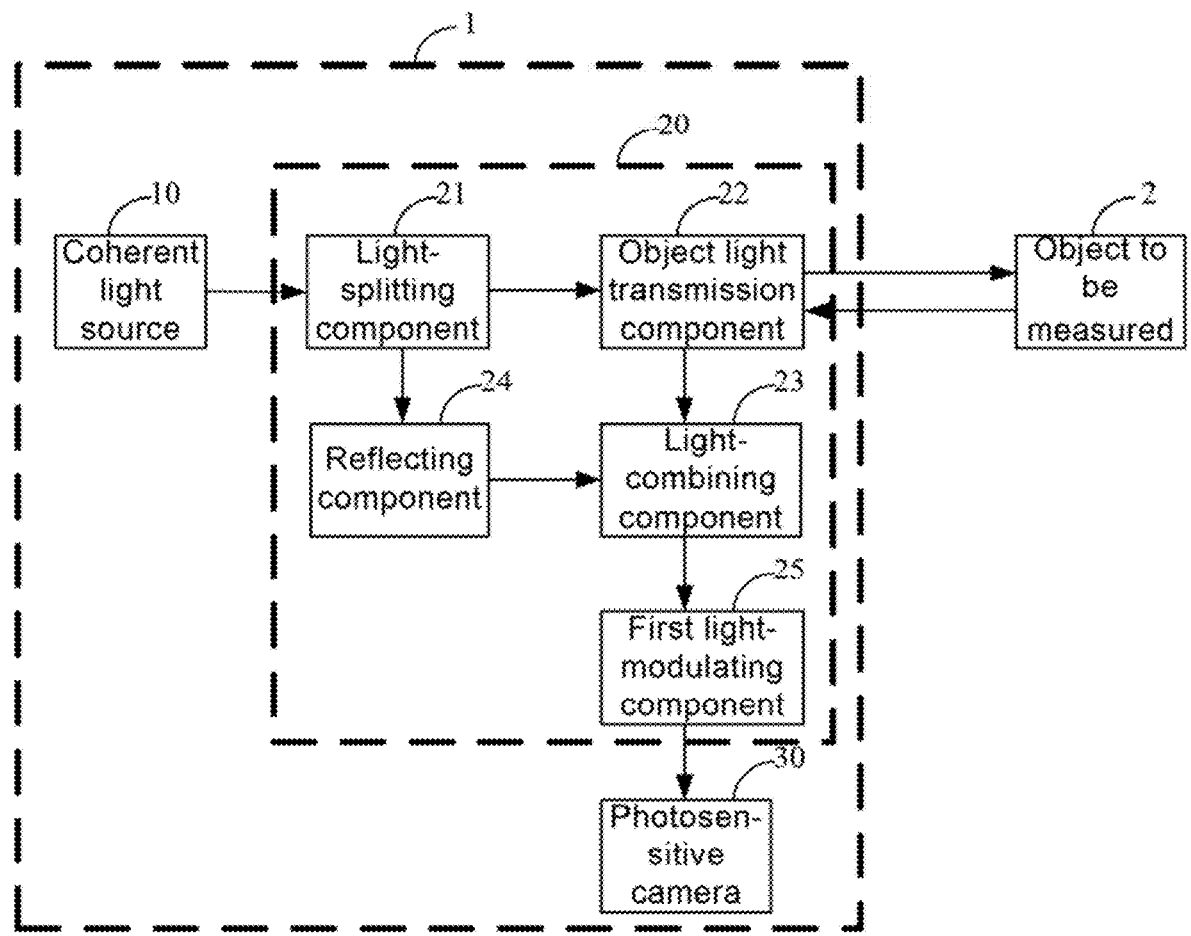
FIG. 5 is a schematic diagram showing a structure of yet another optical apparatus, according to some embodiments of the present disclosure.

On this basis, for example, as shown in FIG. 5, the transmission assembly 20 further includes a reflecting component 24 and a first light-modulating component 25.

The reflecting component 24 is configured to reflect the reference light. That is, the reflecting component 24 may reflect the reference light output by the light-splitting component to the light-combining component 23. For example, as shown in FIG. 6, the reflecting component 24 is a reflecting mirror 241.

The first light-modulating component 25 is disposed at an output of the light-combining component 23. The first light-modulating component 25 is configured to convert the light combined by the light-combining component 23 from linearly polarized light to circularly polarized light. Here, it will be noted that, the light emitted by the coherent light source is the coherent light, and the coherent light is the linearly polarized light. Therefore, the object light and reference light in the combined light are also the linearly polarized light. The linearly polarized reference light and the linearly polarized object light may be converted into two circularly polarized light beams by the first light-modulating component 25. For example, one light beam is a left circularly polarized light beam, and the other light beam is a right circularly polarized light beam. In this way, the two circularly polarized light beams emitted from the first light-modulating component 25 will interfere with each other after passing through each micro-polarizer 311, and thus interference fringes are generated. For example, as shown in FIG. 6, the first light-modulating component 25 is a quarter wave plate 251.

In some embodiments, as shown in FIG. 6, the optical apparatus 1 further includes at least one collimated beam expander 50 disposed between the coherent light source 10 and the light-splitting component 21. Each collimated beam expander 50 includes at least two lenses 501, and focal lengths of the at least two lenses 501 are different. In this way, a diameter of the light emitted by the coherent light source 10 may be enlarged by the at least one collimated beam expander, and a direction of the light may be prevented from being deviated.

In some embodiments, as shown in FIG. 6, the optical apparatus 1 further includes a second light-modulating component 60. The second light-modulating component 60 is disposed between the coherent light source 10 and a collimated beam expander 50 that is most proximate to the coherent light source in the at least one collimated beam expander 50, and is configured to modulate a linear polarization angle of the light emitted by the coherent light source 10. For example, the second light-modulating component 60 is a half wave plate 601. In this way, by rotating the half wave plate 601, a linear polarization angle of light passing through the half wave plate 601 may be modulated, thereby modulating a luminance of the light.

Figure 7:
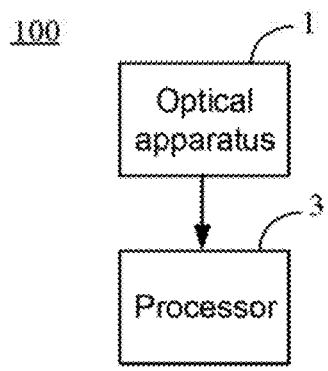
FIG. 7 is a schematic diagram showing a structure of an optical system, according to some embodiments of the present disclosure.

Some embodiments of the present disclosure further provide an optical system 100. As shown in FIG. 7, the optical system 100 includes the optical apparatus 1 in any of the above embodiments, and a processor 3. The processor 3 is configured to calculate the phase information of the object light reflected by the object to be measured 2 according to the light intensity information recorded by the photosensitive camera 30 in the optical apparatus 1, and calculate the amount of strain of the object to be measured 2 according to a change between the phase information before the object to be measured 2 is deformed and the phase information after the object to be measured 2 is deformed.

The processor 3 may be a central processing unit (CPU), or any other general-purpose processor, a digital signal processor (DSP), an application specific integrated circuit (ASIC), a field programmable gate array (FPGA), or any other programmable logic device, a discrete component gate circuit or a transistor logic device, a discrete hardware component or the like. The general-purpose processor may be a micro-processor, or any conventional processor.

In the embodiments, by providing the processor 3, the light intensity information recorded by the photosensitive camera 30 in the optical apparatus 1 may be analyzed and calculated to obtain the phase information of the object light reflected by the surface of the object to be measured 2. The phase information of the object light reflected by the surface of the object to be measured 2 may reflect the spatial position information of the surface of the object to be measured 2. Therefore, the processor 3 may obtain the amount of strain of the object to be measured 2 according to the phase information before the object to be measured 2 is deformed and the phase information after the object to be measured 2 is deformed.

For example, in a case where a main wing of an airplane is measured by using the optical system, the optical apparatus of the optical system may be installed on a main body of the airplane, so that the object light output by the optical apparatus may be radiated onto the main wing of the airplane, and the optical apparatus may receive object light reflected by the main wing. In this way, an amount of strain of the main wing of the airplane may be measured and analyzed by using the optical system. In this case, the processor connected to the optical apparatus in the optical system may be installed inside the airplane or outside the airplane. The processor may be connected to the optical apparatus in a wireless communication manner or in a wired communication manner, as long as the processor is capable of obtaining the light intensity information recorded by the optical apparatus. In addition, the processor may also be integrated into a control system of the airplane.

Figure 8:
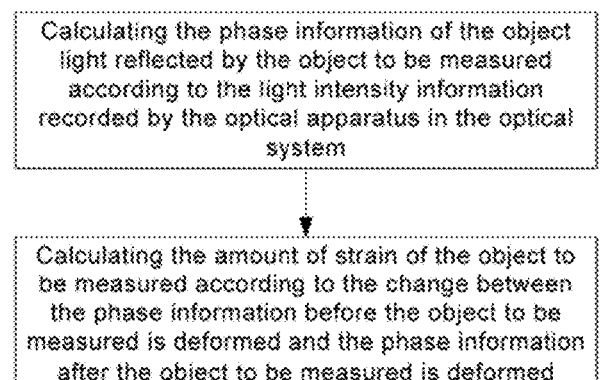
FIG. 8 is a schematic flow diagram of a method for measuring an amount of strain of an object, according to some embodiments of the present disclosure.

Some embodiments of the present disclosure further provide a method for measuring an amount of strain of an object, which is applied to the optical system in any of the above embodiments. As shown in FIG. 8, the method includes: calculating the phase information of the object light reflected by the object to be measured according to the light intensity information recorded by the optical apparatus in the optical system; and calculating the amount of strain of the object to be measured according to the change between the phase information before the object to be measured is deformed and the phase information after the object to be measured is deformed.

In the embodiments, by analyzing and calculating the light intensity information recorded by the optical apparatus in the optical system, the phase information of the object light reflected by the surface of the object to be measured may be obtained. The phase information of the object light reflected by the surface of the object to be measured 2 may reflect the spatial position information of the surface of the object to be measured 2. Therefore, the amount of strain of the object to be measured 2 may be obtained through calculation and analysis according to the phase information before the object to be measured 2 is deformed and the phase information after the object to be measured 2 is deformed.

In some embodiments, the optical apparatus includes a photosensitive camera, and the photosensitive camera includes a micro-polarizer array and an image sensor. The micro-polarizer array includes a plurality of micro-polarizers, and each repeating unit includes at least four adjacent micro-polarizers. All the micro-polarizers included in the repeating unit are arranged in N rows and M columns, and polarization directions of all the micro-polarizers included in the repeating unit are different. N is greater than or equal to 2, and M is greater than or equal to 2. The image sensor includes a plurality of photosensitive elements, and the plurality of photosensitive elements are disposed in one-to-one correspondence with the plurality of micro-polarizers.

The step of calculating the phase information of the object light reflected by the object to be measured according to the light intensity information recorded by the optical apparatus in the optical system includes:

obtaining a relational expression between light intensity information I recorded by each photosensitive element and phase information ω received by a corresponding repeating unit according to a following formula (1):

$$I = \frac{1}{2}[I_s + I_r + 2\sqrt{I_s I_r} \cos(\omega + 2\alpha)], \quad (1)$$

where α represents a polarization angle of a micro-polarizer corresponding to the photosensitive element, $I_s$ represents a light intensity of object light received by the photosensitive element, and $I_r$ represents a light intensity of reference light received by the photosensitive element; and calculating the phase information ω received by the corresponding repeating unit according to the relational expression between the light intensity information I recorded by the photosensitive element and the phase information ω of the object light received by the corresponding repeating unit, and the light intensity information I recorded by the photosensitive element. Phase information ω of the object light received by all the repeating units constitutes the phase information of the object light reflected by the object to be measured.

It will be noted that, in formula (1), the polarization angle α of the micro-polarizer corresponding to the photosensitive element is a known value. Since the polarization directions (i.e., the polarization angles α) of the at least four micro-polarizers included in each repeating unit are not the same, at least four different relational expressions may be obtained based on formula (1). Operations are performed by using the obtained at least four different relational expressions, and then $I_s$ and $I_r$ in the expressions may be canceled out, thereby calculating the phase information ω of the object light reflected by the object to be measured that is received by the corresponding repeating unit.

As for each repeating unit, by providing at least four micro-polarizers with different polarization directions, images of interference fringes corresponding to respective polarization components may be obtained, thereby obtaining the amount of strain of the object to be measured more easily. For example, each repeating unit includes four micro-polarizers, and polarization angles of the four micro-polarizers are 0°, 45°, 90°, and 135°. Or, each repeating unit includes six micro-polarizers, and polarization angles of the six micro-polarizers are 0°, 30°, 45°, 90°, 120°, and 135°.

Each repeating unit includes four micro-polarizers, and the polarization angles of the four micro-polarizers are 0°, 45°, 90°, and 135°.

In this case, relational expressions between light intensity information $I_1$, $I_2$, $I_3$, and $I_4$ recorded by respective photosensitive elements corresponding to the four micro-polarizers in the repeating unit and the phase information ω of the object light received by the repeating unit are respectively:

$$I_1 = \frac{1}{2}[I_s + I_r + 2\sqrt{I_s I_r}\cos(\omega)]; \quad (2)$$

$$I_2 = \frac{1}{2}[I_s + I_r - 2\sqrt{I_s I_r}\sin(\omega)]; \quad (3)$$

$$I_3 = \frac{1}{2}[I_s + I_r - 2\sqrt{I_s I_r}\cos(\omega)]; \quad (4)$$

$$I_4 = \frac{1}{2}[I_s + I_r + 2\sqrt{I_s I_r}\sin(\omega)]. \quad (5)$$

According to relational expressions (2) to (5), and the light intensity information $I_1$, $I_2$, $I_3$, and $I_4$ recorded by the respective photosensitive elements corresponding to respective micro-polarizers in the repeating unit, the phase information of the object light received by the corresponding repeating unit is calculated to be:

$$\omega = \arctan\left(\frac{I_4 - I_2}{I_1 - I_3}\right). \quad (6)$$

In the embodiments, since one ω is obtained through calculation according to $I_1$, $I_2$, $I_3$, and $I_4$ recorded by the four photosensitive elements corresponding to the repeating unit, a resolution of the photosensitive camera is actually changed to a quarter of its own resolution.

It will be noted that, all the ω (i.e., each repeating unit corresponding to one ω) obtained through calculation may be stored as matrix data. Since all the repeating units are actually arranged in a matrix, an arrangement of all the ω may be the same as an arrangement of all the repeating units. For example, as for a repeating unit in a first row and in a first column, one ω is obtained through calculation according to $I_1$, $I_2$, $I_3$, and $I_4$ recorded by four photosensitive elements corresponding to the repeating unit, and the ω may also be in a first row and in a first column in a matrix. As for a repeating unit in a first row and a second column, one ω is obtained through calculation according to $I_1$, $I_2$, $I_3$, and $I_4$ recorded by four photosensitive elements corresponding to the repeating unit, and the ω may also be in the first row and in a second column in the matrix. As for a repeating unit in a p-th row and in a q-th column, one ω is obtained through calculation according to $I_1$, $I_2$, $I_3$, and $I_4$ recorded by four photosensitive elements corresponding to the repeating unit, and the ω may also be in a p-th row and a q-th column in the matrix. In this way, phase information of N rows and M columns may be obtained. p, q, N, and M are all positive integers, p is less than or equal to N, and q is less than or equal to M.

On this basis, in some embodiments, the step of calculating the amount of strain of the object to be measured according to the change between the phase information before the object to be measured is deformed and the phase information after the object to be measured is deformed includes:

obtaining phase information $\omega_2(i,j)$ of object light received by respective photosensitive elements corresponding to respective micro-polarizers in the repeating unit that is in an i-th row and in a j-th column before the object to be measured is deformed, and phase information $\omega_1(i,j)$ of object light received by the respective photosensitive elements corresponding to the respective micro-polarizers in the repeating unit that is in the i-th row and in the j-th column after the object to be measured is deformed;

calculating an amount of strain in an x direction of the surface of the object to be measured that is photographed by the respective photosensitive elements corresponding to the respective micro-polarizers in the repeating unit that is in the i-th row and in the j-th column according to a following formula (7), $\omega_1(i,j)$ and $\omega_2(i,j)$:

$$\varepsilon_x = \frac{\omega_1(i,j) - \omega_2(i,j)}{\Delta x}; \quad (7)$$

and calculating an amount of strain in a y direction of the surface of the object to be measured that is photographed by the respective photosensitive elements corresponding to the respective micro-polarizers in the repeating unit that is in the i-th row and in the j-th column according to a following formula (8), $\omega_1(i,j)$ and $\omega_2(i,j)$:

$$\varepsilon_y = \frac{\omega_1(i,j) - \omega_2(i,j)}{\Delta y}. \quad (8)$$

Where i and j are both positive integers, the x direction and the y direction are perpendicular to each other, and Δx and Δy are respectively actual sizes of a region of the object to be measured corresponding to the photosensitive elements in the x direction and in the y direction.

Whether before the object to be measured is deformed or after the object to be measured is deformed, the ω obtained are in one-to-one correspondence with the repeating units. Therefore, as for each repeating unit, after a difference of $\omega_1$ corresponding to the repeating unit after the object to be measured is deformed and ω2 corresponding to the repeating unit before the object to be measured is deformed is respectively divided by Δx and Δy, the amount of strain in the x direction and the amount of strain in the y direction of the surface of the object to be measured that is photographed by all the photosensitive elements corresponding to the repeating unit may be obtained. Therefore, through calculation from formulas and relational expressions (1) to (8), the amount of strain of the object to be measured may be accurately calculated.

It will be noted that, the x direction and the y direction are any two directions perpendicular to each other in an imaging plane when the corresponding photosensitive elements take a photograph of the object to be measured. Δx and Δy may be obtained in advance by using a related method, and Δx and Δy are known values. For example, Δx and Δy may be obtained by using a calibration method.

By using the method for measuring the amount of strain of the object, the amount of strain of the object to be measured may be measured in real time or periodically. The phase information before the object to be measured is deformed needs to be measured before the object to be measured is deformed. The phase information before the object to be measured is deformed that is obtained may be pre-stored in the processor or a memory for use. A method for measuring the phase information before the object to be measured is deformed may be the method in some embodiments of the present disclosure.

Those skilled in the art will appreciate that, the algorithm steps in the examples described in the embodiments disclosed herein may be implemented by using electronic hardware, computer software, or a combination thereof. In order to clearly describe that the hardware and the software are interchangeable, composition and steps of each example have been described generally in terms of functions in the above description. Whether these functions are implemented by using the hardware or the software depends on specific applications and design constraints of the technical solution. Those skilled in the art may use different methods to implement the described functions for each specific application. However, such implementation should not be considered to exceed the scope of the present disclosure.

For example, the method described in some embodiments of the present disclosure may be implemented by executing software instructions. The software instructions may be composed of corresponding software modules, which may be stored in a random access memory (RAM), a flash memory, a read only memory (ROM), an erasable programmable ROM (EPROM), an electrically EPROM (EEPROM), a register, a hard disk, a mobile hard disk, a compact disc read only memory (CD-ROM) or a storage medium in any other form known in the art.

Therefore, some embodiments of the present disclosure provide a non-transitory computer-readable storage medium storing computer program instructions configured to perform one or more steps of the above method for measuring the amount of strain of the object, so as to measure the amount of strain the object to be measured.

Some embodiments of the present disclosure provide a computer program product. The computer program product includes instructions that, when run on a computer, cause the computer to perform one or more steps of the method for measuring the amount of strain of the object according to some embodiments of the present disclosure to measure the amount of strain of the object to be measured.

Those skilled in the art will appreciate that, in one or more examples described above, functions described herein may be implemented by using hardware, software, firmware or any combination thereof. In a case where the functions are implemented by using the software, the functions may be stored in the non-transitory computer-readable storage medium or may be transmitted as one or more instructions or codes in the non-transitory computer-readable storage medium. The non-transitory computer-readable storage medium includes a computer storage medium or a communication medium. The communication medium includes any medium that facilitates transmission of a computer program from one place to another. The storage medium may be any available medium that may be accessed by a general-purpose computer or a special-purpose computer.

Some embodiments of the present disclosure provide an electronic device including a processor and a memory. The memory stores computer program instructions suitable for being executed by the processor. When the computer program instructions are run by the processor, the processor performs one or more steps in the above method for measuring the amount of strain of the object to measure the amount of strain of the object to be measured.

The processor is used to support the electronic device to perform one or more steps in the above method for measuring the amount of strain of the object, and/or is used for other processes for the techniques described herein. The processor may be a central processing unit (CPU), or any other general-purpose processor, or a digital signal processor (DSP), an application specific integrated circuit (ASIC), a field programmable gate array (FPGA), or any other programmable logic device, a discrete component gate circuit or a transistor logic device, a discrete hardware component, or the like. The general-purpose processor may be a microprocessor, or any conventional processor.

The memory is used to store program codes and data of the electronic device provided by some embodiments of the present disclosure. The processor may perform various functions of the electronic device by running or executing software programs stored in the memory, and calling the data stored in the memory.

The memory may be, but is not limited to, a read-only memory (ROM) or a static storage device of any other type that can store static information and instructions, a random access memory (RAM), or a dynamic storage device of any other type that can store information and instructions, or an electrically erasable programmable read-only memory (EEPROM), a compact disc read-only memory (CD-ROM) or any other disc, a compact disc (including a compact disc, a laser disc, an optical disc, a digital general-purpose disc, and a Blu-ray disc), a magnetic disk storage medium or any other magnetic disk storage device, or any other medium that can be used to carry or store desired program codes with instructions or data and can be accessed by a computer. The memory may exist independently and be connected to the processor through a communication bus. The memory may also be integrated with the processor.

The foregoing descriptions are merely specific implementation manners of the present disclosure, but the protection scope of the present disclosure is not limited thereto. The protection scope of the present disclosure shall be subject to the protection scope of the claims.

What is claimed is:

1. An optical system, comprising:
an optical apparatus and a processor,
wherein the optical apparatus comprises:
a coherent light source;
a transmission assembly configured to receive light emitted by the coherent light source, split the light into object light and reference light so that the object light and the reference light travel along different paths, receive object light reflected by an object to be measured, and combine the object light reflected by the object to be measured and the reference light; and
a photosensitive camera disposed at an output of the transmission assembly and configured to receive combined light and process the combined light to record light intensity information capable of characterizing a spatial position of a surface of the object to be measured;
the processor configured to calculate phase information of the object light reflected by the object to be measured according to light intensity information recorded by the photosensitive camera in the optical apparatus, and calculate an amount of strain of the object to be measured according to a change between phase information before the object to be measured is deformed and phase information after the object to be measured is deformed;
wherein a micro-polarizer array comprises a plurality of micro-polarizers arranged in an array, and the plurality of micro-polarizers are divided into a plurality of repeating units which are same as each other, each repeating unit comprises at least four adjacent micro-polarizers, all micro-polarizers comprised in each repeating unit are arranged in N rows and M columns, and polarization directions of all the micro-polarizers comprised in the repeating unit are different, wherein N is greater than or equal to 2, M is greater than or equal to 2; and an image sensor comprises a plurality of photosensitive elements disposed in one-to-one correspondence with the plurality of micro-polarizers;
calculating the phase information of the object light reflected by the object to be measured according to the light intensity information recorded by the optical apparatus in the optical system, comprises:
obtaining a relational expression between light intensity information I recorded by each photosensitive element and phase information ω of object light received by a corresponding repeating unit according to a following formula (1):

$$I = \frac{1}{2}[I_s + I_r + 2\sqrt{I_s I_r} \cos(\omega + 2\alpha)], \quad (1)$$

wherein α represents a polarization angle of a micro-polarizer corresponding to the photosensitive element, $I_s$ represents a light intensity of object light received by the photosensitive element, and $I_r$ represents a light intensity of reference light received by the photosensitive element; and
calculating the phase information ω of the object light received by the corresponding repeating unit according to the relational expression between the light intensity information I recorded by the photosensitive element and the phase information ω of the object light received by the corresponding repeating unit, and the light intensity information I recorded by the photosensitive element, wherein phase information ω of object light received by all repeating units constitutes the phase information of the object light reflected by the object to be measured;
wherein in a case where each repeating unit comprises four micro-polarizers, and polarization angles of the four micro-polarizers are 0°, 45°, 90°, and 135°,
relational expressions between light intensity information $I_1$, $I_2$, $I_3$, and $I_4$ recorded by respective photosensitive elements corresponding to respective micro-polarizers in the repeating unit and the phase information ω of the object light received by the repeating unit are respectively:

$$I_1 = \frac{1}{2}[I_s + I_r + 2\sqrt{I_s I_r} \cos(\omega)]; \quad (2)$$

$$I_2 = \frac{1}{2}[I_s + I_r - 2\sqrt{I_s I_r} \sin(\omega)]; \quad (3)$$

$$I_3 = \frac{1}{2}[I_s + I_r - 2\sqrt{I_s I_r} \cos(\omega)]; \quad (4)$$

$$I_4 = \frac{1}{2}[I_s + I_r + 2\sqrt{I_s I_r} \sin(\omega)]; \text{ and} \quad (5)$$

according to relational expressions (2) to (5), and the light intensity information $I_1$, $I_2$, $I_3$, and $I_4$ recorded by the respective photosensitive elements corresponding to the respective micro-polarizers in the repeating unit, the phase information of the object light received by the corresponding repeating unit is calculated to be:

$$\omega = \arctan\left(\frac{I_4 - I_2}{I_1 - I_3}\right). \quad (6)$$

wherein calculating the amount of strain of the object to be measured according to a change between the phase information before the object to be measured is deformed and the phase information after the object to be measured is deformed, comprises:
obtaining phase information $\omega_2(i,j)$ of object light received by respective photosensitive elements corresponding to respective micro-polarizers in a repeating unit that is in an i-th row and in a j-th column before the object to be measured is deformed, and phase information $\omega_1(i,j)$ of object light received by the respective photosensitive elements corresponding to the respective micro-polarizers in the repeating unit that is in the i-th row and in the j-th column after the object to be measured is deformed;
calculating an amount of strain in an x direction of the surface of the object to be measured that is photographed by the respective photosensitive elements corresponding to the respective micro-polarizers in the repeating unit that is in the i-th row and in the j-th column according to a following formula (7), $\omega_1(i,j)$ and $\omega_2(i,j)$:

$$\varepsilon_x = \frac{\omega_1(i,j) - \omega_2(i,j)}{\Delta x}; \quad (7)$$

and
calculating an amount of strain in a y direction of the surface of the object to be measured that is photographed by the respective photosensitive elements corresponding to the respective micro-polarizers in the repeating unit that is in the i-th row and in the j-th column according to a following formula (8), $\omega_1(i,j)$ and $\omega_2(i,j)$:

$$\varepsilon_y = \frac{\omega_1(i,j) - \omega_2(i,j)}{\Delta y}, \tag{8}$$

wherein i and j are both positive integers, the x direction and the y direction are perpendicular to each other, and $\Delta x$ and $\Delta y$ are respectively actual sizes of a region of the object to be measured corresponding to the photosensitive elements in the x direction and in the y direction.

2. The optical system according to claim 1, wherein the photosensitive camera comprises:
   the micro-polarizer array configured to cause interference between the object light reflected by the object to be measured and the reference light in the combined light to generate interference fringes; and
   an image sensor configured to record light intensity information of the interference fringes.

3. The optical system according to claim 1, wherein the plurality of micro-polarizers in the micro-polarizer array are attached to the image sensor through a photosensitive adhesive; or
   the image sensor comprises a wafer in which the plurality of photosensitive elements are disposed, and the micro-polarizer array is formed on the wafer.

4. The optical system according to claim 1, wherein the transmission assembly comprises:
   a light-splitting component configured to split the light emitted by the coherent light source into the object light and the reference light, polarization directions of which are perpendicular to each other;
   an object light transmission component configured to receive the object light, direct the object light toward the object to be measured, and reflect the object light reflected by the object to be measured; and
   a light-combining component configured to receive object light reflected by the object light transmission component and the reference light, and combine the object light reflected by the object light transmission component and the reference light.

5. The optical system according to claim 4, wherein the transmission assembly further comprises:
   a reflecting component configured to reflect the reference light output from the light-splitting component to the light-combining component; and
   a first light-modulating component disposed at an output of the light-combining component, and configured to convert light combined by the light-combining component from linearly polarized light to circularly polarized light.

6. The optical system according to claim 5, wherein the reflecting component comprises a reflecting mirror; and
   the first light-modulating component comprises a quarter wave plate.

7. The optical system according to claim 5, further comprising:
   at least one collimated beam expander disposed between the coherent light source and the light-splitting component, wherein each collimated beam expander comprises at least two lenses, and focal lengths of the at least two lenses are different.

8. The optical system according to claim 7, further comprising:
   a second light-modulating component disposed between the coherent light source and a collimated beam expander that is most proximate to the coherent light source in the at least one collimated beam expander, wherein the second light-modulating component is configured to modulate a linear polarization angle of the light emitted by the coherent light source.

9. The optical system according to claim 8, wherein the second light-modulating component comprises a half wave plate.

10. The optical system according to claim 4, wherein the light-splitting component comprises a first polarization beam splitter prism; and
    the light-combining component comprises a second polarization beam splitter prism.

11. The optical system according to claim 4, wherein the object light transmission component comprises a transflective beam splitter prism.

12. A method for measuring an amount of strain of an object, applied to the optical system according to claim 1, the method comprising:
    calculating the phase information of the object light reflected by the object to be measured according to the light intensity information recorded by the optical apparatus in the optical system; and
    calculating the amount of strain of the object to be measured according to a change between the phase information before the object to be measured is deformed and the phase information after the object to be measured is deformed;
    wherein the photosensitive camera comprises a micro-polarizer array and an image sensor; the micro-polarizer array comprises a plurality of micro-polarizers arranged in an array, and the plurality of micro-polarizers are divided into a plurality of repeating units which are same as each other, and each repeating unit comprises at least four adjacent micro-polarizers, each repeating unit comprises at least four adjacent micro-polarizers, all micro-polarizers comprised in each repeating unit are arranged in N rows and M columns, and polarization directions of all the micro-polarizers comprised in the repeating unit are different, wherein N is greater than or equal to 2, M is greater than or equal to 2; and the image sensor comprises a plurality of photosensitive elements disposed in one-to-one correspondence with the plurality of micro-polarizers;
    calculating the phase information of the object light reflected by the object to be measured according to the light intensity information recorded by the optical apparatus in the optical system, comprises:
    obtaining a relational expression between light intensity information I recorded by each photosensitive element and phase information $\omega$ of object light received by a corresponding repeating unit according to a following formula (1):

$$I = \frac{1}{2}\left[I_s + I_r + 2\sqrt{I_s I_r}\cos(\omega + 2\alpha)\right], \tag{1}$$

wherein $\alpha$ represents a polarization angle of a micro-polarizer corresponding to the photosensitive element, $I_s$ represents a light intensity of object light received by the photosensitive element, and $I_r$ represents a light intensity of reference light received by the photosensitive element; and calculating the phase information ω of the object light received by the corresponding repeating unit according to the relational expression between the light intensity information I recorded by the photosensitive element and the phase information ω of the object light received by the corresponding repeating unit, and the light intensity information I recorded by the photosensitive element, wherein phase information ω of object light received by all repeating units constitutes the phase information of the object light reflected by the object to be measured;

wherein in a case where each repeating unit comprises four micro-polarizers, and polarization angles of the four micro-polarizers are 0°, 45°, 90°, and 135°, relational expressions between light intensity information $I_1$, $I_2$, $I_3$, and $I_4$ recorded by respective photosensitive elements corresponding to respective micro-polarizers in the repeating unit and the phase information ω of the object light received by the repeating unit are respectively:

$$I_1 = \frac{1}{2}[I_s + I_r + 2\sqrt{I_s I_r} \cos(\omega)]; \quad (2)$$

$$I_2 = \frac{1}{2}[I_s + I_r - 2\sqrt{I_s I_r} \sin(\omega)]; \quad (3)$$

$$I_3 = \frac{1}{2}[I_s + I_r - 2\sqrt{I_s I_r} \cos(\omega)]; \quad (4)$$

$$I_4 = \frac{1}{2}[I_s + I_r + 2\sqrt{I_s I_r} \sin(\omega)]; \quad (5)$$

and according to relational expressions (2) to (5), and the light intensity information $I_1$, $I_2$, $I_3$, and $I_4$ recorded by the respective photosensitive elements corresponding to the respective micro-polarizers in the repeating unit, the phase information of the object light received by the corresponding repeating unit is calculated to be:

$$\omega = \arctan\left(\frac{I_4 - I_2}{I_1 - I_3}\right); \quad (6)$$

wherein calculating the amount of strain of the object to be measured according to a change between the phase information before the object to be measured is deformed and the phase information after the object to be measured is deformed, comprises:

obtaining phase information $\omega_2(i,j)$ of object light received by respective photosensitive elements corresponding to respective micro-polarizers in a repeating unit that is in an i-th row and in a j-th column before the object to be measured is deformed, and phase information $\omega_1(i,j)$ of object light received by the respective photosensitive elements corresponding to the respective micro-polarizers in the repeating unit that is in the i-th row and in the j-th column after the object to be measured is deformed;

calculating an amount of strain in an x direction of the surface of the object to be measured that is photographed by the respective photosensitive elements corresponding to the respective micro-polarizers in the repeating unit that is in the i-th row and in the j-th column according to a following formula (7), $\omega_1(i,j)$ and $\omega_2(i,j)$ $$\varepsilon_x = \frac{\omega_1(i,j) - \omega_2(i,j)}{\Delta x}; \quad (7)$$

and calculating an amount of strain in a y direction of the surface of the object to be measured that is photographed by the respective photosensitive elements corresponding to the respective micro-polarizers in the repeating unit that is in the i-th row and in the j-th column according to a following formula (8), $\omega_1(i,j)$ and $\omega_2(i,j)$ $$\varepsilon_y = \frac{\omega_1(i,j) - \omega_2(i,j)}{\Delta y}, \quad (8)$$

wherein i and j are both positive integers, the x direction and the y direction are perpendicular to each other, and Δx and Δy are respectively actual sizes of a region of the object to be measured corresponding to the photosensitive elements in the x direction and in the y direction.

13. A non-transitory computer-readable storage medium storing computer program instructions that, when run by the processor, cause the processor to perform one or more steps of the method for measuring the amount of strain of the object according to claim 12.

14. An electronic device, comprising the processor and a memory, wherein the memory stores computer program instructions suitable for being executed by the processor, and when the computer program instructions are run by the processor, the processor performs one or more steps of the method for measuring the amount of strain of the object according to claim 12.

* * * * *